(12) United States Patent
Sonobe et al.

(10) Patent No.: US 7,638,569 B2
(45) Date of Patent: Dec. 29, 2009

(54) GEAR

(75) Inventors: Kenya Sonobe, Tokyo (JP); Miho Sonobe, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 11/993,329

(22) PCT Filed: Jul. 19, 2006

(86) PCT No.: PCT/JP2006/314226

§ 371 (c)(1),
(2), (4) Date: Oct. 8, 2008

(87) PCT Pub. No.: WO2007/010917

PCT Pub. Date: Jan. 25, 2007

(65) Prior Publication Data

US 2009/0137712 A1    May 28, 2009

(30) Foreign Application Priority Data

Jul. 19, 2005    (JP) .............................. 2005-208579

(51) Int. Cl.
C08K 3/20 (2006.01)
(52) U.S. Cl. .................. 524/425; 524/593; 475/331
(58) Field of Classification Search ................ 524/425, 524/593; 475/331
See application file for complete search history.

(56) References Cited

U.S. PATENT DOCUMENTS

| | | | |
|---|---|---|---|
| 5,106,896 A | 4/1992 | Endo et al. | |
| 6,391,956 B1 | 5/2002 | Horio et al. | |
| 6,936,651 B2 * | 8/2005 | Flexman et al. | 524/413 |
| 2004/0242747 A1 * | 12/2004 | Nandi | 524/425 |
| 2004/0258906 A1 * | 12/2004 | Scaramuzzino | 428/330 |
| 2007/0179231 A1 | 8/2007 | Sonobe et al. | |

FOREIGN PATENT DOCUMENTS

| | | |
|---|---|---|
| JP | 1-263145 | 10/1989 |
| JP | 11-13861 | 1/1999 |
| JP | 11-51154 | 2/1999 |
| JP | 11-82686 | 3/1999 |
| JP | 2001-323990 | 11/2001 |
| JP | 2001-323991 | 11/2001 |
| JP | 2002-20577 | 1/2002 |
| JP | 2002-96366 | 4/2002 |
| JP | 2002-31213 | 1/2003 |
| JP | 2004-506772 | 3/2004 |
| JP | 2004-263026 | 9/2004 |
| JP | 2004-340160 | 12/2004 |
| JP | 2005-187728 | 7/2005 |
| WO | 99/32751 | 9/1999 |
| WO | 02/014429 | 2/2002 |
| WO | WO 02/14429 A1 * | 2/2002 |
| WO | 2005/071011 | 8/2005 |

OTHER PUBLICATIONS

English language Abstract of JP 2004-263026.
English language Abstract of JP2005-187728.
English language Abstract of JP11-13861, (1999).
English language Abstract of JP11-82686, (1999).
English language Abstract of JP11-82686, (1999).
English language Abstract of JP 2001-323990.
English language Abstract of JP2001-323991.
English language Abstract of JP 2002-96366.
English language Abstract of JP 2002-31213.
English language Abstract of JP 2004-340160.
English language Abstract of JP 11-51154, (1999).
English language Abstract of JP 2002-20577.
Molded plastic Gear Handbook, 1995, $1^{st}$ edition, ed. Molded Plastic Gear Research Expert Committee of Precision Engineering Institution, Published by Sigma, pp. 58-68.
Breakthrough and Applied Technology of Dispersion and Aggregation, 1992, $1^{st}$ edition, ed. F. Kitahara, published by Techno System Co., pp. 237-237. an accompanied by an English language translation.

* cited by examiner

*Primary Examiner*—Bernard Lipman
(74) *Attorney, Agent, or Firm*—Greenblum & Bernstein, P.L.C.

(57) ABSTRACT

The present invention is an injection-molded gear made of a polyacetal resin composition comprising a polyacetal and a filler having a particular shape and particle diameter. An object thereof is to provide a gear which has durability and is excellent in the balance between dimensional accuracy and rotation transmission accuracy. Specifically, the gear is an injection-molded gear made of a polyacetal resin composition comprising more than 5 and less than 100 parts by mass of a filler (II) having a particle size distribution satisfying a particular expression and an average aspect ratio (L/D), i.e., a ratio of an average major-axis length (L) of the particles to an average minor-axis length (D) of the particles, of less than 3 and 0 or less than 10 parts by mass of an organic acid (III) based on 100 parts by mass of a polyacetal (I), characterized in that the gear comprises 10% or less of aggregates of the filler (II) having an aggregate diameter of 3 µm or more.

19 Claims, No Drawings

GEAR

TECHNICAL FIELD

The present invention is a gear made of a polyacetal resin composition comprising a polyacetal and a filler having a particular shape and particle diameter. The gear has durability and is excellent in the balance between dimensional accuracy and rotation transmission accuracy.

BACKGROUND ART

Polyacetal is a high-crystalline engineering plastic and is widely used as a gear such as spur, helical, screw, pinion and rack gears for structural parts and the like of precision apparatuses in the electric and electronic field because it is excellent particularly in slidability and fatigue resistance in addition to mechanical characteristics. Polyacetal also features excellence in moldability, which often allows these gears to be produced by an injection molding method.

The quality and performance of products have been improved in the field of precision apparatuses in recent years; as a result, there is also a need for improved performance for the gears used. By way of example, an image-forming apparatus such as a laser printer, a facsimile machine and a copier is sturdier, smaller and capable of splendid printing with more rapidity and precision, such that it has a higher commercial value. In the image-forming apparatus, gears are used as parts for transmitting and controlling the movement, angle, etc. of a photoreceptor drum, a developing roller or the like. Thus, these gears are being required not only to have improved durability and dimensional accuracy compared to conventional gears but also to be particularly excellent in rotation transmission accuracy.

Here, the dimensional accuracy of gears refers to roundness and pitch error, tooth profile error, tooth trace error, tooth space runout, etc. Here, the roundness indicates whether the initial gear shape forms a proper circle; the pitch error, tooth profile error, tooth trace error, tooth space runout, etc. represent accuracy against the initial specifications (the initial gear shape) and are values measured by the method prescribed in JIS D 1702. The rotation transmission accuracy is the accuracy of rotation transmission when the gear is actually driven; specifically, it is represented, for example, by the double or single flank meshing error prescribed in JGMA (Japan Gear Manufacturers Association) 116-2.

The dimensional accuracy sometimes suggests a relation with the rotation transmission accuracy. However, a gear practically rotates in a state subjected to torque; therefore, thrust is produced on the flank, which may result in the gear moving with deformation or deflection. Thus, a gear excellent in dimensional accuracy sometimes cannot necessarily be said to be excellent also in rotation transmission accuracy. In addition, a mechanism is present in which the torque loading on a gear varies during the rotation thereof; it may also be necessary that the rotation transmission accuracy does not change.

As conventional techniques, methods for improving the dimensional accuracy are disclosed which include, for example, a method involving improving a decrease in the module, an arrangement of a gear shape such as thinning and the design of a rib or the like as a reinforcing mechanism (e.g., patent documents 1 and 2), a method involving performing improvement in the method of producing the gear, such as partially pressuring the molded product, or using the reduction of resin viscosity by allowing the molten resin to contain a gas (e.g., patent documents 3 to 6), a method involving subjecting the prepared gear to secondary processing such as aging treatment, and, further, a method involving achieving accuracy by designing a gear train (e.g., patent document 7). The above techniques allow gears to have sufficient durability and are also effective for dimensional accuracy. However, a problem has been posed that the type, rib structure and the like of the gear used are limited, and a problem has further been present that equipment investment is required for producing a gear, e.g., it is necessary to modify an injection molding machine.

Accordingly, methods have been attempted for improving materials themselves used as gears to provide gears excellent in dimensional accuracy and rotation transmission accuracy. Examples thereof include a method involving optimizing the proportion of a copolymerized component in a polyacetal (e.g., patent document 8), a method involving blending a particular ester compound in a polyacetal (e.g., patent document 9) and, further, a method involving blending wollastonite having a particular shape and a sliding agent in a polyacetal (e.g., patent document 10). However, the above methods for improving materials have some effect, but have yet failed to be sufficiently satisfactory in rotation transmission accuracy.

Reinforcement by adding a filler seems to be effective to obtain a gear excellent in dimensional accuracy and rotation transmission accuracy by improvement of a material. However, the method involving adding a filler is known to reduce the slidability of a polyacetal and tends to be poorly used for gears. (For example, non-patent document 1). In addition, the addition of a filler is described to be hardly capable of having a sufficiently satisfactory effect on the accuracy of gears. (For example, patent documents 6 and 8).

Thus, it has been difficult in conventional techniques to obtain a durable gear well-balancedly having the dimensional accuracy and rotation transmission accuracy being required in recent years by an injection molding method, which is excellent in industrial productivity.

Patent Document 1: JP-A-11-013861
Patent Document 2: JP-A-11-082686
Patent Document 3: JP-A-2001-323990
Patent Document 4: JP-A-2001-323991
Patent Document 5: JP-A-2002-096366
Patent Document 6: JP-A-2002-031213
Patent Document 7: JP-A-2004-340160
Patent Document 8: JP-A-11-051154
Patent Document 9: JP-A-2002-020577
Patent Document 10: International Publication WO9943751 (Corresponding U.S. Pat. No. 6,391,956)
Non-Patent Document 1: Molded Plastic Gears Handbook, p 58-68, 1st Edition, edited by Molded Plastic Gear Research Expert Committee of Precision Engineering Institution, published by Sigma on Apr. 20, 1995.

The present invention is a gear made of a polyacetal resin composition comprising a polyacetal and a filler having a particular shape and particle diameter. An object thereof is to provide a gear which has durability and is excellent in the balance between dimensional accuracy and rotation transmission accuracy.

DISCLOSURE OF THE INVENTION

As a result of intensive studies for solving the above-described problems, the present inventor has found that an injection-molded gear made of a polyacetal resin composition comprising a polyacetal and a filler having a particular shape and particle diameter has durability and is excellent in the balance between dimensional accuracy and rotation transmission accuracy, thereby accomplishing the present invention.

Specifically, the present invention is as follows.

(1) An injection-molded gear made of a polyacetal resin composition comprising more than 5 and less than 100 parts by mass of a filler (II) and 0 or less than 10 parts by mass of an organic acid (III) based on 100 parts by mass of the polyacetal (I), characterized in that the filler (II) has a particle size distribution satisfying the following general expression and an average aspect ratio (L/D), i.e., a ratio of an average major-axis length (L) of the particles to an average minor-axis length (D) of the particles, of less than 3; and the gear comprises 10% or less of aggregates of the filler (II) having an aggregate diameter of 3 μm or more:

$0.1\ \mu m < D50 < 1.5\ \mu m$ $0 < (D90 - D10)/D50 \leq 2$ (wherein D10, D50 and D90 represent particle diameters corresponding to cumulative particle size frequencies of 10, 50 and 90, in the order of increasing particle diameter, as measured by a laser diffraction scattering method).

(2) An injection-molded gear made of a polyacetal resin composition comprising more than 5 and less than 100 parts by mass of a filler (II) and 0 or less than 10 parts by mass of an organic acid (III) based on 100 parts by mass of the polyacetal (I), characterized in that the filler (II) has a particle size distribution satisfying the following general expression and an average aspect ratio (L/D), i.e., a ratio of an average major-axis length (L) of the particles to an average minor-axis length (D) of the particles, of less than 3; and the gear has a total meshing error (according to JIS B 1702) of less than 5 minutes in a single-flank meshing test:

$0.1\ \mu m < D50 < 1.5\ \mu m$ $0 < (D90 - D10)/D50 \leq 2$ (wherein D10, D50 and D90 represent particle diameters corresponding to cumulative particle size frequencies of 10, 50 and 90, in the order of increasing particle diameter, in particle size measurement by a laser diffraction scattering method).

(3) An injection-molded gear made of a polyacetal resin composition comprising more than 5 and less than 100 parts by mass of a filler (II) and 0 or less than 10 parts by mass of an organic acid (III) based on 100 parts by mass of the polyacetal (I), characterized in that the filler (II) has a particle size distribution satisfying the following general expression and an average aspect ratio (L/D), i.e., a ratio of an average major-axis length (L) of the particles to an average minor-axis length (D) of the particles, of less than 3; and the gear comprises 10% or less of aggregates of the filler (II) having an aggregate diameter of 3 μm or more and has a total meshing error of less than 5 minutes in a single-flank meshing test:

$0.1\ \mu m < D50 < 1.5\ \mu m$ $0 < (D90 - D10)/D50 \leq 2$ (wherein D10, D50 and D90 represent particle diameters corresponding to cumulative particle size frequencies of 10, 50 and 90, in the order of increasing particle diameter, as measured by a laser diffraction scattering method).

(4) The injection-molded gear described in any of items (1) to (3), characterized in that the resin composition comprises more than 20 and less than 80 parts by mass of the filler (II) based on 100 parts by mass of the polyacetal (1).

(5) The injection-molded gear described in any of items (1) to (4), characterized in that the filler (II) is an inorganic filler.

(6) The injection-molded gear described in any of items (1) to (5), characterized in that the filler (II) has a particle size distribution satisfying the following general expression:

$0.1\ \mu m < D50 < 1.0\ \mu m$ $0 < (D90 - D10)/D50 \leq 1.2$.

(7) The injection-molded gear described in any of items (1) to (6), characterized in that the filler (II) is spherical, cubical, rectangular parallelepiped or amorphous, or a mixture thereof.

(8) The injection-molded gear described in any of items (1) to (7), characterized in that the filler (II) has a BET specific surface area of 10 to 200 $m^2$ μg.

(9) The injection-molded gear described in any of items (1) to (8), characterized in that the filler (II) has a D90 of 1.5 μm or less.

(10) The injection-molded gear described in any of items (1) to (9), characterized in that the filler (II) is calcium carbonate.

(11) The injection-molded gear described in any of items (1) to (10), characterized in that the filler (II) is light calcium carbonate.

(12) The injection-molded gear described in any of items (10) to (11), characterized in that the filler (II) is calcium carbonate, wherein the calcium carbonate has a content of Na of 250 ppm or less based on Ca.

(13) The injection-molded gear described in any of items (10) to (12), characterized in that the filler (II) is calcium carbonate, wherein the calcium carbonate has a content of Sr of 500 ppm to 2,500 ppm based on Ca.

(14) The injection-molded gear described in any of items (10) to (13), characterized in that the resin composition comprises 0.01 or less than 5 parts by mass of the organic acid (III) based on 100 parts by mass of the polyacetal (I).

(15) The injection-molded gear described in any of items (10) to (14), characterized in that the organic acid (III) is a saturated fatty acid having 8 to 36 carbon atoms.

(16) The injection-molded gear described in term (15), characterized in that the organic acid (III) is stearic acid.

(17) The injection-molded gear described in any of items (1) to (16), characterized in that the polyacetal (I) is obtained by stabilizing treatment of the thermally unstable ends thereof using at least one quaternary ammonium compound represented by the following formula:

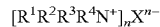

(wherein $R^1$, $R^2$, $R^3$ and $R^4$ each independently represent an alkyl group having 1 to 30 carbon atoms or an aryl group having 6 to 20 carbon atoms; the alkyl group is straight-chain, branched or cyclic; a hydrogen atom(s) in the alkyl or aryl group is optionally substituted with an alkyl group, an aryl group or halogen; n represents an integer of 1 to 3; and X represents a hydroxyl group or an acid residue of a carboxylic acid having 1 to 20 carbon atoms, a hydroacid, an oxo acid, an inorganic thioacid or an organic thioacid having 1 to 20 carbon atoms.).

(18) The injection-molded gear described in any of items (1) to (17), characterized in that the polyacetal (I) is a copolymer having a melting point of 164 to 172° C.

(19) A method for producing the injection-molded gear described in term (1), characterized in that a polyacetal resin composition is injection-molded which is obtained by simultaneously melt-kneading the polyacetal (I), the filler (II) and the organic acid (III).

The injection-molded gear of the present invention has the advantages of having durability and being excellent in dimensional accuracy and rotation transmission accuracy.

BEST MODE FOR CARRYING OUT THE INVENTION

The present applied invention is described below in detail.

The polyacetal (I) is a known polyacetal and is not particularly limited. Polyacetal homopolymers include a homopolymer of formaldehyde monomer or a cyclic oligomer of formaldehyde such as formaldehyde trimer (trioxane) and formaldehyde tetramer (tetraoxane), composed substantially of oxymethylene units alone. Polyacetal copolymers include a copolymer of formaldehyde monomer or a cyclic oligomer of formaldehyde such as formaldehyde trimer (trioxane) and formaldehyde tetramer (tetraoxane) with a cyclic ether such as ethylene oxide, propylene oxide and epichlorohydrin or a cyclic formal of glycol or diglycol such as 1,3-dioxolane or 1,4-butanediol formal.

Polyacetal copolymers can also include a branched polyacetal copolymer having branching obtained by copolymerizing a monofunctional glycidyl ether and a crosslinked polyacetal copolymer having a crosslinked structure obtained by copolymerizing a polyfunctional glycidyl ether. Examples of the copolymers can further include a block polyacetal copolymer having a block component obtained by polymerizing formaldehyde monomer or a cyclic oligomer of formaldehyde in the presence of a compound having a functional group such as a hydroxyl group in one or both ends, for example, a polyalkylene glycol, and a block polyacetal copolymer having a block component obtained by copolymerizing formaldehyde monomer or a cyclic oligomer of formaldehyde such as formaldehyde trimer (trioxane) or formaldehyde tetramer (tetraoxane) with a cyclic ether or a cyclic formal similarly in the presence of a compound having a functional group such as a hydroxyl group in one or both ends, for example, a hydrogenated polybutadiene glycol. According to the present invention, the above polyacetals may be used alone or in a mixture of two or more thereof.

Among the above polyacetals, the polyacetal (I) is preferably a random polyacetal copolymer in which comonomer components are randomly bonded or a block, branched or crosslinked polyacetal copolymer, or a mixture thereof in view of excellence in the balance between mechanical characteristics and thermal stability, and more preferably a random or block polyacetal copolymer in view of cost.

In the polyacetal copolymer, the addition amount of a comonomer such as 1,3-dioxolane is preferably 0.1 to 60 mol %, more preferably 0.1 to 20 mol %, most preferably 0.15 to 10 mol % based on 1 mole of trioxane in view of more excellence in the balance between mechanical characteristics and thermal resistance. The melting point of the polyacetal depends on the comonomer amount; however, it is preferably 164° C. to 172° C., more preferably 165° C. to 171° C., most preferably 167° C. to 170° C.

In addition, in view of thermal stability, the polyacetal (I) preferably has a formaldehyde emission rate of 15 ppm or less from 10 minutes to 30 minutes after the initiation of heating at 220° C. in a stream of nitrogen, and more preferably 10 ppm/min or less, most preferably 5 ppm/min or less during the period. The measurement of the above formaldehyde emission rate will now be specifically described. The polyacetal is heat-melted at 220° C. in a stream of nitrogen (50 NL/hr); the emitted formaldehyde is absorbed in water and then titrated by a sodium sulfite method. The emission rate is expressed by the following equation where $Y_2$, $Y_{10}$, $Y_{30}$, $Y_{50}$ and $Y_{90}$ represent formaldehyde emissions (ppm) from the initiation of heating to 2, 10, 30, 50 and 90 minutes, respectively.

The calculation is carried out using the equation:

The emission rate from 2 min to 10 min after the initiation of heating: $(Y_{10}-Y_2)/8$ (ppm/min), The emission rate from 10 min to 30 min after the initiation of heating: $(Y_{30}-Y_{10})/20$ (ppm/min) or The emission rate from 50 min to 90 min after the initiation of heating: $(Y_{90}-Y_{50})/40$ (ppm/min).

The emission of formaldehyde from 2 minutes to 10 minutes is due to formaldehyde remaining in the polyacetal; the emission thereof from 10 minutes to 30 minutes, to formaldehyde produced by the terminal decomposition of the polyacetal; and the emission from 50 minute to 90 minutes, to formaldehyde produced by the main-chain decomposition of the polyacetal. Smaller values of the emission rates provide more excellent thermal stability. According to the present invention, the rate of terminal decomposition of the polyacetal, i.e., the emission rate of formaldehyde from 10 minutes to 30 minutes, is preferably in the above range.

The melt flow index MFI (as measured according to ASTM-D1238) of the polyacetal (I) is not particularly limited; however, it is preferably 0.1 g/10 min to 150 g/10 min, more preferably 0.5 g/10 min to 100 g/10 min, most preferably 1 g/10 min to 50 g/10 min in view of moldability.

The polyacetal (I) can be produced by a known method for producing polyacetal without particular limitation. Examples thereof include a method which involves polymerizing high purity formaldehyde by introduction into an organic solvent containing a basic polymerization catalyst such as an organic amine, an organic or inorganic tin compound and a metal hydroxide before filtering off and heating the filtered-off polymer in acetic anhydride in the presence of sodium acetate to acetylate the polymer ends to produce a polyacetal homopolymer. Methods for obtaining a polyacetal copolymer can include a method which involves introducing high purity trioxane, a copolymerization component such as ethylene oxide and 1,3-dioxolane, and a chain transfer agent for molecular weight control into an organic solvent such as cyclohexane, followed by subjecting to cationic polymerization with a polymerization catalyst such as a Lewis acid (e.g., boron trifluoride-diethyl ether complex) and then performing the inactivation of the catalyst and the stabilization of the end groups, or a method which involves introducing, without using any solvent, trioxane, a copolymerization component, a chain transfer agent for molecular weight control and a catalyst into a self-cleaning extrusion kneader such as a Ko-kneader, a twin-screw continuous extrusion kneader and a twin-axis paddle type continuous mixer for bulk polymerization and then further adding a quaternary ammonium compound such as choline formate hydroxide to decompose and remove the unstable ends to produce the copolymer.

Methods for obtaining a favorable polyacetal (I) excellent in thermal stability can include a method which involves stabilizing a polyacetal by treating the thermally unstable ends thereof using at least one quaternary ammonium compound represented by the following formula.

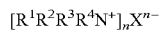

(wherein $R^1$, $R^2$, $R^3$ and $R^4$ each independently represent an alkyl group having 1 to 30 carbon atoms or an aryl group having 6 to 20 carbon atoms; the alkyl group is straight-chain, branched or cyclic; the hydrogen atom in the alkyl or aryl group may be substituted with an alkyl group, an aryl group or halogen; n represents an integer of 1 to 3; and X represents a hydroxyl group or an acid residue of a carboxylic acid having 1 to 20 carbon atoms, a hydroacid, an oxo acid, an inorganic thioacid or an organic thioacid having 1 to 20 carbon atoms.)

In the above general formula, preferred $R^1$, $R^2$, $R^3$ and $R^4$ are each independently an alkyl group having 1 to 5 carbon atoms or a hydroxyalkyl group having 2 to 4 carbon atoms; more preferably, at least one of $R^1$, $R^2$, $R^3$ and $R^4$ is a hydroxyethyl group. Specific examples of the quaternary ammonium compound include:

hydroxides of a quaternary ammonium such as tetramethylammonium, tetraethylammonium, tetrapropylammonium, tetra-n-butylammonium, cetyltrimethylammonium, tetradecyltrimethylammonium, 1,6-hexamethylenebis(trimethylammonium), decamethylene-bis-(trimethylammonium), trimethyl-3-chloro-2-hydroxypropylammonium, trimethyl(2-hydroxyethyl)ammonium, triethyl(2-hydroxyethyl)ammonium, tripropyl(2-hydroxyethyl)ammonium, tri-n-butyl(2-hydroxyethyl)ammonium, trimethylbenzylammonium, triethylbenzylammonium, tripropylbenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyltri(2-hydroxyethyl)ammonium and tetrakis(hydroxyethyl)ammonium;

a hydroacid salt thereof in which the acid residue is from hydrochloric acid, bromic acid, fluoric acid or the like;

an oxo acid salt thereof in which the acid residue is from sulfuric acid, nitric acid, phosphoric acid, carbonic acid, boric acid, chloric acid, iodic acid, silicic acid, perchloric acid, chlorous acid, hypochlorous acid, chlorosulfuric acid, amidesulphuric acid, disulfuric acid, tripolyphosphoric acid or the like;

a thioacid salt thereof in which the acid residue is from thiosulfuric acid; and a carboxylate thereof in which the acid residue is from formic acid, acetic acid, propionic acid, butanoic acid, isobutyric acid, pentanoic acid, caproic acid, caprylic acid, capric acid, benzoic acid, oxalic acid or the like. Among others, preferred are a hydroxide, a sulfate, a carbonate, a borate and a carboxylate. The carboxylate is particularly preferably a salt of formic acid, acetic acid or propionic acid. These quaternary ammonium compounds may be used alone or in a combination of two or more thereof.

The addition amount of the above quaternary ammonium compound is 0.05 to 50 mass ppm, preferably 1 to 30 mass ppm in terms of the amount of nitrogen derived from the quaternary ammonium compound expressed by the following equation, based on the total mass of the polyacetal and the quaternary ammonium compound.

$$P \times 14/Q$$

(wherein P represents the concentration (mass ppm) of the quaternary ammonium compound based on the polyacetal, 14 represents the atomic weight of nitrogen; and Q represents the molecular weight of the quaternary ammonium compound.)

An addition amount of the quaternary ammonium compound of less than 0.05 mass ppm tends to decrease the decomposition rate of the unstable ends. More than 50 mass ppm tends to reduce the color tone of the polyacetal after the decomposition of the unstable ends.

A preferred method for decomposing the above unstable ends is a method which involves kneading the quaternary ammonium compound and the polyacetal at a resin temperature of not less than the melting point of the polyacetal to not more than 260° C. using an extruder, a kneader or the like. Here, the resin temperature is preferably not more than 260° C. because of problems of coloration and polymer main chain decomposition.

A method for adding the quaternary ammonium compound is not particularly restricted; examples thereof include a method which involves adding the compound as an aqueous solution in the step of inactivating the polymerization catalyst and a method which involves spraying the compound on a powder of the resin. Any of the addition methods used may be requested that the compound is added in the step of heat-treating the polyacetal; the compound may be injected into an extruder, or may be impregnated into a pellet of the resin and subjected to the decomposition of the unstable ends in the subsequent blending step. The unstable ends can be decomposed after inactivating the polymerization catalyst in the polyacetal obtained by polymerization or without inactivating the polymerization catalyst.

The filler (II) has a particular particle size distribution to be described and a particular aspect ratio and is not particularly limited, provided that it is a known filler added to resin. Examples thereof include the two primary categories of fillers: an inorganic filler and an organic filler.

Examples of the inorganic filler include:

a silicate such as silica, quartz powder, glass bead, powdered glass, calcium silicate, aluminium silicate, kaolin, talc, clay, diatomite and wollastonite;

a metal oxide such as iron oxide, titanium oxide, alumina and zinc oxide;

a metal sulfate such as calcium sulfate and barium sulfate;

a carbonate such as calcium carbonate, magnesium carbonate and dolomite; silicon carbide; silicon nitride; boron nitride; various metal powders; mica; glass flake; glass balloon; silica balloon; shirasu balloon; and metal balloon. These inorganic fillers may be used alone or in a mixture of two or more thereof.

A filler is preferable which is small in the particle diameter, sharp in the particle size distribution and excellent in dispersion in polyacetal. Use of such a filler can provide a gear having durability and high accuracy. Inorganic fillers preferable from such a point of view can include silica, quartz powder, glass bead, powdered glass, calcium silicate, aluminium silicate, kaolin, talc, clay, diatomite, iron oxide, titanium oxide, alumina, zinc oxide, calcium carbonate, magnesium carbonate, boron nitride, mica and glass flake. More Preferred is silica, glass bead, powdered glass, aluminium silicate, kaolin, talc, clay, zinc oxide, calcium carbonate, boron nitride, or mica. Still more preferred is silica, kaolin talc, zinc oxide, or calcium carbonate. Most preferred is calcium carbonate.

The calcium carbonate is not particularly limited provided that it is a known calcium carbonate, and may be, for example, in any of the calcite, aragonite and vaterite crystalline forms which are generally known. The type of calcium carbonate may also be naturally-occurring heavy calcium carbonate or light calcium carbonate obtained by an artificial synthesis method. The light calcium carbonate is sometimes called colloidal calcium carbonate, precipitated calcium carbonate, activated calcium carbonate, or the like. These can be used alone or in a mixture of two or more thereof.

In view of having moderate wettability with polyacetal and being excellent in dispersibility, preferred examples of the calcium carbonate can include light calcium carbonate. The crystalline form is preferably a calcite form from a similar point of view.

In addition, the calcium carbonate preferably has a Na amount of 250 ppm or less, more preferably 150 ppm or less, most preferably 100 ppm or less based on Ca. Similarly, it preferably has a Sr amount of 500 to 2,500 ppm, more preferably 700 to 1,300 ppm, most preferably 800 to 1,000 ppm based on Ca. The amounts of Na and Sr based on Ca can be determined by high-frequency inductively coupled plasma (ICP) optical emission spectrometry. More specifically, 0.5 g of the calcium carbonate is weighed in a platinum dish and carbonized in an electric furnace at 500° C. The carbonized material is cooled, subjected to addition of 5 mL of hydrochloric acid and 5 mL of purified water, and dissolved by boiling on a heater. The solution is again cooled and subjected to addition of purified water into a measurable concentration, followed by quantitative determination at the characteristic wavelength of each metal by high-frequency inductively coupled plasma (ICP) optical emission spectrometry using IRIS/IP manufactured by Thermo Jarrell Ash Corporation. Thereafter, the amounts of Na and Sr based on Ca are calculated. When the amounts of Na and Sr based on Ca in the filler (II) contained in a gear are quantitated, preferred methods therefor can include a method which involves cutting out a portion of the injection-molded gear to weigh 0.5 g thereof on a platinum dish before carbonation in an electric furnace at 500° C., followed by performing calculation in the same procedure. Here, the Na and Sr are derived from impurities contained in the calcium carbonate. Calcium carbonate is generally produced, for example, by a method involving pulverizing and purifying naturally-occurring heavy calcium carbonate and a method involving artificially synthesizing, before purification, by blowing carbon dioxide gas into a calcium hydroxide aqueous solution and, if necessary, adding an aggregation inhibitor and a surface-treating agent. Here, Na contained in the water or the like and Sr capable of replacing Ca may be incorporated as impurities in the calcium carbonate in any of these steps. Na and Sr may also be contained as impurities in limestone or the like providing a raw material for calcium carbonate. The contents of Na and Sr based on Ca being in the above ranges tend to provide a polyacetal resin composition excellent in the balance between thermal stability and mechanical characteristics and in creep life and fatigue resistance, which gives a gear excellent in durability. The reasons therefor are not apparent; however, they probably lie in that setting the contents to the above ranges has the effects of making smaller the particle diameter of calcium carbonate and rendering shaper the particle size distribution thereof and makes better the wettability thereof with the polyacetal.

The organic filler is not particularly limited provided that it is an organic filler composed of a hydrocarbon having a higher melting or softening point as determined by differential scanning calorimetry (DSC) according to JIS K7121 than the polyacetal (I). Examples thereof can include a fine powder or fine particles of epoxy resin, melamine resin, urea resin, acrylic resin, phenol resin, Teflon (registered trademark) resin, styrene resin, saturated or unsaturated polyester resin, aliphatic or aromatic polyamide resin, polyphenylene ether resin or the like and a fine powder or fine particles of super engineering plastic resin such as liquid crystal polymer resin, polyether ketone resin, polyimide resin, polysulfone resin or the like. The organic filler may be a powder or fine particle of a low molecular weight resin or a powder or fine particle of a high molecular weight or crosslinked resin, or can also be that obtained by subjecting a resin resulting from polymerization to mechanical treatment such as pulverization. These fillers may be used alone or in a mixture of two or more thereof.

In view of cost and the thermal stability of a filler, a preferred organic filler is a fine powder or fine particle comprising epoxy resin, melamine resin, urea resin, acrylic resin, phenol resin, Teflon (registered trademark) resin, styrene resin, saturated or unsaturated polyester resin or aliphatic or aromatic polyamide resin which has a low or high molecular weight or is crosslinked. More preferred is a fine powder or fine particle comprising epoxy resin, melamine resin, urea resin, acrylic resin, phenol resin, styrene resin, saturated or unsaturated polyester resin or aliphatic or aromatic polyamide resin which has a low or high molecular weight or is crosslinked. Most preferred is a fine powder or fine particle comprising epoxy resin, melamine resin, urea resin, phenol resin, styrene resin or saturated or unsaturated polyester resin which has a low or high molecular weight or is crosslinked.

The filler (II) has a particle size distribution satisfying the following general expression:

$$0.1 \ \mu m < D50 < 1.5 \ \mu m$$

$$0 < (D90 - D10)/D50 \leq 2$$

(wherein D10, D50 and D90 represent particle diameters corresponding to cumulative particle size frequencies of 10, 50 and 90, in the order of increasing particle diameter, in particle size measurement by a laser diffraction scattering method).

In the above particle size distribution, preferred is $0.1 \ \mu m < D50 < 1.0 \ \mu m$, more preferably $0.15 \ \mu m < D50 < 0.75 \ \mu m$, most preferably $0.20 \ \mu m < D50 < 0.5 \ \mu m$.

In the present invention, (D90−D10)/D50 was used as a sharpness of particle size. Preferred is $0 < (D90-D10)/D50 < 1.2$, more preferably $0 < (D90-D10)/D50 \leq 1.1$, most preferably $0 < (D90-D10)/D50 < 1.0$.

D90 is preferably 1.5 μm or less, more preferably 1.25 μm or less, most preferably 1.0 μm or less.

Limitation of the filler within the ranges tends to make excellent the mechanical characteristics of the resultant polyacetal resin composition and to render the injection-molded gear obtained therefrom excellent in durability and dimensional accuracy and also less in rotation transmission error due to single-flank meshing error.

The apparatus used in the laser diffraction scattering method is not particularly limited; examples thereof include Microtrac Particle Size Analyzer X-100 manufactured by Nikkiso Co., Ltd.

The measurement is carried out by adding the filler (II) to a liquid, vigorously mixing the mixture using a ultrasonic wave or the like and introducing the prepared dispersion as a sample into the apparatus. The liquid used is preferably water, alcohol or a low-volatile organic solvent in view of workability. In addition, the measurement is preferably performed, as needed, after increasing the dispersibility by adding a polyelectrolyte such as, for example, an inorganic pigment dispersant manufactured by Toagosei Co., Ltd. (trade name: Aron), a dispersant manufactured by Kao Corporation (trade name: Poise) or the like. This is because the filler (II) is preferably dispersed to primary particle diameter without forming aggregates. Here, the resultant particle size distribution chart preferably shows normal distribution. In addition, for particles large in the aspect ratio described below, the particle size distribution curve obtained by this measurement tends to show a multi-peak structure; however, according to the present invention, a single-peak structure is preferable.

Preferred methods for measuring the particle diameter of the filler (II) contained in the injection-molded gear can include a method which involves, for example, when the filler (II) is an inorganic filler, cutting out a portion of the gear, subjecting the polyacetal component thereof to thermal decomposition in an electric furnace at 500° C., and measuring the shape of the inorganic finer from the residue by the above laser diffraction scattering method. The preferred methods can also include a method which involves, when the filler (II) is an organic filler, cutting out a portion of the injection-molded gear, separating the filler thereof by an extraction method or the like using the polyacetal component thereof and a suitable solvent, and measuring the shape of the separated organic filler by the above laser diffraction scattering method.

The filler (II) used in the present invention has an average aspect ratio (L/D), i.e., a ratio of an average major-axis length (L) of the particles to an average minor-axis length (D) of the particles, of 3 or less. Here, a preferred aspect ratio (L/D) is 2 or less, more preferably 1.5 or less, most preferably 1.0. The ratio being within the range tends to make excellent the mechanical characteristics of the resultant polyacetal resin composition and to render the injection-molded gear obtained therefrom excellent in durability and dimensional accuracy and also in rotation transmission accuracy.

The above shape is calculated by defining the shortest distance between two parallel lines touching the outline of the plan view of the particle as the minor-axis length and the maximum distance between the parallel lines in the direction perpendicular thereto as the major-axis length according to Heywood's definition. Here, the average particle diameter, average major-axis length and average aspect ratio are calculated by the following equation when $N_i$ filler particles with $L_i$ in major-axis length and $D_i$ in minor-axis length are present in unit volume.

Average particle diameter=Average major-axis length=$\Sigma L_i^2 N_i/\Sigma L_i N_i$ Average minor-axis length=$\Sigma D_i^2 N_i/\Sigma D_i N_i$ Average aspect ratio $L/D=(\Sigma L_i^2 N_i/\Sigma L_i N_i)/(\Sigma D_i^2 N_i/\Sigma D_i N_i)$ More specifically, the aspect ratio is determined by photographing filler particle images at a magnification of 1,000 to 50,000 times (the magnification of such a degree that the particle shape can be observed) using a scanning electron microscope (SEM) and then measuring the respective lengths from at least 100 filler particles randomly selected.

Preferred methods for measuring the average aspect ratio (L/D) of the filler (II) from the injection-molded gear can include a method which involves, for example, when the filler (II) is an inorganic filler, cutting out a portion of the gear, subjecting the polyacetal component thereof to thermal decomposition in an electric furnace at 500° C., and measuring the shape of the inorganic filler from the residue using the above scanning electron microscope (SEM). The preferred methods can also include a method which involves, when the filler (II) is an organic filler, cutting out a portion of the injection-molded gear, separating the filler by an extraction method or the like using the polyacetal component thereof and a suitable solvent, and measuring the shape of the separated organic filler using the above scanning electron microscope (SEM).

The specific surface area of the filler (II) is preferably 10 to 200 $m^2$ μg, more preferably 10 to 100 $m^2/g$, most preferably 10 to 50 $m^2/g$ when determined by a BET adsorption method. According to the present invention, the specific surface area was obtained using nitrogen gas adsorption. The shape of the filler (II) is preferably spherical, cubical, rectangular parallelepiped or amorphous or a mixture thereof, more preferably spherical, cubical or rectangular parallelepiped or a mixture thereof. The filler (II) having the above shape makes excellent the mechanical characteristics of the resultant polyacetal resin composition and tends to render the gear obtained therefrom excellent in durability and dimensional accuracy and also in rotation transmission accuracy.

For the purpose of improving wettability with and dispersibility in the polyacetal (I), the filler (II) can have the surface subjected to adhesion of or treatment with a known surface-treating agent, adhesion agent or complexing agent and an aggregation inhibitor. For example, an agent may be used such as an anionic surfactant, a cationic surfactant, an amphoteric surfactant and a nonionic surfactant as described in "Bunsan/Gyoshu no Kaimei to Oyogijutsu (Breakthrough and applied technology of Dispersion and Aggregation), 1992" (ubder the editorship by Fumio Kitahara and published by Techno System Co., Ltd.) p. 232-237. Further examples of the agents can include a silane coupling agent such as aminosilane and epoxysilane, a titanate coupling agent, an organic acid such as a fatty acid (saturated or unsaturated fatty acid), an alicyclic carboxylic acid and a resin acid, and a metal soap. These agents can be used alone or in a mixture of two or more thereof.

The blending amount of the filler (II) is more than 5 and less than 100 parts by mass based on 100 parts by mass of the polyacetal (I). A preferred addition amount of the filler (II) is more than 20 to 80 parts by mass, more preferably more than 25 to 60 parts by mass, most preferably more than 30 parts by mass to 50 parts by mass based on 100 parts by mass of the polyacetal (I) in view of making the polyacetal resin composition more excellent in mechanical characteristics and rendering the resultant injection-molded gear excellent in the balance among durability, dimensional accuracy and rotation transmission accuracy.

Particularly, when the filler (II) is calcium carbonate, the organic acid (III) may be contained as a dispersant. The organic acid refers to:

a monovalent or polyvalent carboxylic acid having aliphatic and aromatic groups or that having a substituent such as a hydroxyl group introduced into a part thereof, or an acid anhydride thereof;

a monovalent or polyvalent sulfonic acid having aliphatic and aromatic groups or that having a substituent such as a hydroxyl group introduced into a part thereof; or a monovalent or polyvalent phosphoric acid having aliphatic and aromatic groups or that having a substituent such as a hydroxyl group introduced into a part thereof. The organic acid is not particularly limited provided that it is a known compound. Examples of thereof can include, as saturated fatty acids, acetic acid, propionic acid, butyric acid, valeric acid, caproic acid, caprylic acid, lauric acid, tridecylic acid, myristylic acid, palmitic acid, heptadecylic acid, stearic acid, pivalic acid, isobutyric acid, and ethylenediamine tetraacetic acid.

Examples thereof can include, as unsaturated fatty acids, oleic acid, elaidic acid, erucic acid, linolic acid, and recinoleic acid.

Examples thereof can include, as a alicyclic carboxylic acid, naphthenic acid.

Examples thereof can include, as resin acids, abietic acid, pimaric acid, palustric acid and neoabietic acid, and acid anhydrides thereof.

Examples of the monovalent or polyvalent sulfonic acid can include laurylsulfonic acid, polyoxyethylene lauryl ether sulfonic acid, dodecylbenzenesulfonic acid and dialkylsulfosuccinic acids.

Among these organic acids, in view of thermal stability and color tone, preferred examples thereof can include a saturated fatty acid, an unsaturated fatty acid, an alicyclic carboxylic acid and a resin acid which are monovalent or polyvalent carboxylic acids. In addition, a saturated fatty acid is preferable in view of dispersibility in polyacetal and color tone. Further, a saturated fatty acid is preferable which has 8 to 36 carbon atoms, more preferably 10 to 30 carbon atoms, most preferably 12 to 24 carbon atoms in view of the bleeding-out of a carboxylic acid in a resultant polyacetal resin composition on the surface of a molded product thereof. Examples thereof can include lauric acid, tridecylic acid, myristylic acid, pentadecylic acid, palmitic acid, heptadecylic acid, stearic acid, nonadecanoic acid, arachic acid, behenic acid, lignoceric acid, cerotic acid, heptacosanoic acid, montanic acid, linoleic acid, and arachidonic acid. Among others, stearic acid is most preferable. These can be used alone or in a mixture of two or more thereof.

The organic acid (III) may be heated, mixed and stirred together with calcium carbonate using a Henschel mixer or the like for surface treatment, or the polyacetal (I), calcium carbonate and the organic acid (III) may be simultaneously added in melt-kneading using a twin screw extruder.

The organic acid (III) is optionally added. According to the present invention, the addition amount thereof is 0 to 10 (inclusive) parts by mass based on 100 parts by mass of the polyacetal (I). Preferred is 0.01 or less than 5 parts by mass, more preferably 0.1 or less than 3 parts by mass, most preferably 0.3 or less than 1.5 parts by mass particularly when the filler (II) is calcium carbonate. The addition amount being within the above range tends to make excellent the dispersion of calcium carbonate and to render the resultant injection-molded gear excellent in the balance among durability, dimensional accuracy and rotation transmission accuracy.

A method for producing the polyacetal resin composition used in the injection-molded gear of the present invention is not particularly limited; examples thereof include a method involving dissolving the polyacetal (I) in a solvent, adding the filler (II) thereto before mixing the mixture, and removing the solvent, a method involving adding the filler (II) to the heat-melted polyacetal (I) before mixing the mixture, a method involving adding a preprepared master batch of the filler (II), or a combined method thereof. Among these production methods, in view of excellent productivity, preferred methods can include a method involving adding the filler (II) to the heat-melted polyacetal (I) and a method involving simultaneously heat-melting the polyacetal (I) and the filler (II), i.e., melt-kneading methods.

An apparatus employed for production by the melt-kneading method may be a kneader which is generally in practical use. For example, a single-screw or multi-screw knead-extruder, a roll or a Banbury mixer may be used. Among others, most preferred is a twin-screw extruder provided with a decompressor and a side feeder. Examples of the melt-kneading method can include a method involving simultaneously kneading all components, a method involving performing kneading using a blended product obtained by preliminary kneading, and a method involving carrying out kneading by feeding the components in succession on the way of an extruder. The filler (II) and the like can also be preliminarily dispersed in a solvent and added in a slurry state. Here, the feeding can also be performed using a liquid addition pump.

Here, the conditions of melt-kneading are not particularly limited; however, the decompression is preferably 0 to 0.07 MPa. The kneading temperature is preferably a temperature 1 to 100° C. higher than the melting or softening point determined by differential scanning calorimetry (DSC) measurement according to JIS K7121. The preferred kneading temperature is 160° C. to 240° C. The shear rate in the kneader is preferably 100 (sec$^{-1}$) or more. The average residence time in the kneader is preferably 1 to 15 minutes. The amount of the solvent in the composition is preferably 1 mass % or less. The conditions being within the above ranges provide excellent productivity and tend to suppress the discoloration of a resultant polyacetal resin composition.

When calcium carbonate is used as the filler (II) in the melt-kneading method, in view of obtaining a polyacetal resin composition more excellent in the balance of mechanical characteristics, more preferred examples of the production method can include a method which involves simultaneously melt-kneading more than 5 and less than 100 parts by mass of calcium carbonate and 0.005 to 5 parts by mass of the organic acid (III) based on 100 parts by mass of the polyaetal (I) at a temperature not less than the melting point of the polyaetal (I). The production method eliminates the step of using the organic acid (III) to preliminarily mix calcium carbonate therewith a Henschel mixer or the like and carrying out chemical surface treatment or coating. The reason why the production method provides excellent mechanical characteristics is not apparent; however, it probably lies in that the polyaetal (I), calcium carbonate and organic acid (III) each exhibit good wettability concomitantly with dispersion.

The injection-molded gear of the present invention is also obtained by a method for injection-molding the above polyacetal resin composition. The injection molding method is not particularly limited and may be a known method. For example, insert molding with metal, out-sert molding or gas assist molding may be used in addition to a common injection molding method. The gate shape of the mold used is also not particularly limited; examples thereof include a pin gate, a side gate, a tab gate, a film gate, a submarine gate, a fan gate, a ring gate, a direct gate, and a disk gate.

According to the injection-molded gear of the present invention, the preferred dispersion state of the filler (II) is that the amount of particles having an aggregate diameter of 3 μm or more is 5% or less, more preferably 3% or less, most preferably 1% or less, in view of the durability and dimensional accuracy of the gear and the single flank meshing test thereof.

Here, the aggregate diameter is determined by the following measurement method.

(a) Small pieces are cut out of the axis portion of the injection-molded gear, the circular portion of the tooth pitch and the portion containing the tooth root using a coping saw and the like.

(b) Slices 80 nm in thickness are cut out of the small pieces using a microtome.

(c) Each slice is observed by photography at a magnification ranging from 1,000 to 50,000 times (a magnification of a degree that the shape of the filler can be observed) using a transmission electron microscope (TEM).

(d) The total area (defined as $X_O$) of filler portions is calculated from the image analysis of the resultant photograph.

(e) From the image analysis of the resultant photograph, a group of particles bound together among the filler particles is defined as an aggregate; there is calculated the sum (defined as $X_A$) of the areas of particle groups having an aggregate diameter (wherein when particles are aggregated in an elliptical sphere form or the like, the maximal dimension of the aggregate is defined as the aggregate diameter) of 3 μm or more, among the whole aggregates.

(f) Proportion of particles having an aggregate diameter of 3 μm or more=$X_A/X_O \times 100\%$ The injection-molded gear of the present invention preferably has a total meshing error of less than 5 minutes in a single-flank meshing test. Here, as used herein, the total meshing error refers to a measurement obtained from a single-flank meshing test according to JIS B1702; the conditions thereof are as follows.

Measurement environment: 23° C. and 50 RH %

Master gear: An inspection gear having the same initial specifications (module, number of teeth, standard normal pressure angle, and helical angle) as those of the molded gear. The gear used has a face width larger than the effective face width of the sample gear for measurement. It is mounted on the driving side.

Sample gear for measurement: It is mounted on the working side.

Center distance: A pitch circle+0.1× a module for each of the master gear and sample gear for measurement.

Torque: 0.39 Nm.

Rotation speed: 300 rpm as the rotation speed of the molded gear.

Number of preliminary rotations before testing: 10 rotations.

Measurement: After preliminary rotation, the sample gear for measurement is rotated 3 turns to measure the advance and delay of the rotation angle of the sample gear for measurement for each turn to calculate the total meshing error according to JIS B1702.

Here, the total meshing error of the gear is more preferably less than 4 minutes, still more preferably less than 3 minutes, most preferably less than 2 minutes in view of high accurate transmission of the gear and particularly excellent high image quality and high speed printing capacity when the gear is used as a photoreceptor drum gear of a printer.

The error being within the range makes the gear of the present invention excellent particularly in durability, dimensional accuracy and single flank meshing accuracy as a gear and thus probably tends to enable the high speed high quality printing by a printer using the gear as a gear of a photoreceptor drum or the like thereof. In addition, the injection-molded gear of the present invention has an approximately constant rotation transmission error even when the torque loading on the gear varies; thus, it seems to be particularly useful as a photoreceptor drum gear of a printer. The type and shape of the injection-molded gear of the present invention are not particularly limited. For example, the module, number of teeth, helical angle, pressure angle and the like determining the shape of the gear are optionally selected. Examples of the type of the gear include a spur gear, an internal gear, a rack, a helical gear, a double helical gear, a straight bevel gear, a skew bevel gear, a spiral bevel gear, a crown gear, a contrate gear, a screw gear, a cylindrical worm gear, a hypoid gear, and a Novikov gear. When the durability and dimensional accuracy of a gear is required, a helical gear or the like is generally used, which has a high meshing ratio. Also according to the present invention, making the shape into a helical gear gives a more excellent effect on the balance among the durability, dimensional accuracy and rotation transmission accuracy of the gear.

The gear of the present invention can be easily produced by a general injection molding method and further features excellence in dimensional accuracy and rotation transmission accuracy, excellence in the balance thereof, and the like. This easily supports the production of gears having various modules, numbers of teeth and meshing ratios. In addition, the gear also has durability to the higher speed rotation and higher torque required by use environment, and satisfies high rotation transmission accuracy under the conditions. Because of these features, the injection-molded gear of the present invention can be suitably used in applications requiring durability and accuracy, for example, in precision apparatus applications including printing driving components for printers, copying machines or the like and driving components for digital cameras, hard disks, DVD players or the like.

EXAMPLES

The present invention is described below in further detail by way of Examples. However, the present invention is not intended to be limited to the following Examples. In addition, the evaluation described in Examples and Comparative Examples below was carried out by the following methods.

(1) Physical Properties of Polyacetal and Polyacetal Resin Composition (1-1) Melt Flow Index (MFI: g/10 min)

MFI was measured under conditions of 190° C. and 2,160 g using MELT INDEXER manufactured by Toyo Seiki Seisaku-Sho Ltd.) according to ASTM-D1238.

(1-2) Mechanical Characteristics of Polyacetal and Polyacetal Resin Composition

Dumbbell and strip pieces for evaluation were obtained under injection molding conditions of 15 seconds of injection and 25 seconds of cooling at a cylinder temperature of 200° C. and a mold temperature of 70° C. using a injection molding machine (SH-75 manufactured by Sumitomo Heavy Industries, Ltd.) to evaluate the following items.

(1-2-1) Bending Modulus (GPa) and Bending Strength (MPa)

Bending modulus and bending strength were evaluated according to ASTM D790.

(1-2-2) Tensile Elongation (%) and Tensile Strength (MPa)

Tensile elongation and tensile strength were evaluated according to ASTM D638.

(1-2-3) Notched Izod Impact Strength

Notched Izod impact strength was evaluated according to ASTM D256.

(2) Observation of Dispersion State of Particles in Gear

The proportion of particles having an aggregate diameter of 3 μm or more was calculated using the following method.

(a) A small piece is cut out of the circular portion of a gear pitch using a coping saw and a nipper.

(b) A slice 80 mm in thickness is cut out of the small piece using a microtome.

(c) The slice is observed by photography at a magnification ranging from 1,000 to 50,000 times (a magnification of a degree that the shape of the filler can be observed) using a transmission electron microscope (TEM).

(d) The total area (defined as $X_O$) of filler portions is calculated from the image analysis of the resultant photograph.

(e) Of the filler particles, a group of particles bound together is defined as an aggregate by the image analysis of the resultant photograph; there is calculated the sum (defined as $X_A$) of the areas of particle groups having an aggregate diameter (wherein when particles are aggregated in an elliptical sphere form or the like, the maximal dimension of the aggregate is defined as an aggregate diameter) of 3 μm or more, among the whole aggregates.

(f) Proportion of particles having an aggregate diameter of 3 μm or more=$X_A/X_O \times 100\%$ The following instruments were used in the evaluation.

Microtome: Cryomicrotome manufactured by Reichert Nissei.

Transmission electron microscope (TEM): HF 2000 manufactured by Hitachi Ltd.

This test was performed with any tooth of the teeth of the gear.

The following components were used in Examples and Comparative Examples.

<Polyacetal>

(1-1) Tenac (registered trademark) HC750, a polyacetal copolymer manufactured by Asahi Kasei Chemicals Corporation.

MFI=28 g/10 min (1-2) A mixture of 65 parts by mass of Tenac (registered trademark) HC450, a polyacetal copolymer manufactured by Asahi Kasei Chemicals Corporation with 35 parts by mass of Tenac (registered trademark) HC750, a polyacetal (copolymer) manufactured by Asahi Kasei Chemicals Corporation.

MFI=15 g/10 min (1-3) Tenac (registered trademark) 4520, a polyacetal copolymer manufactured by Asahi Kasei Chemicals Corporation.

MFI=10 g/10 min

The mechanical characteristics of the polyacetals (1-1 to 1-3) are shown in Table 2.

<Filler: Calcium Carbonate>

(2-1) Calfine 200M, a light calcium carbonate manufactured by Maruo Calcium Co., Ltd.

(2-2) A production prototype, a light calcium carbonate manufactured by Konoshima Chemical Co., Ltd.

(2-3) Brilliant-15, a light calcium carbonate manufactured by Shiraishi Kogyo Kaisha, Ltd.

(2-4) PC, a light calcium carbonate manufactured by Shiraishi Kogyo Kaisha, Ltd.

(2-5) Silver-W, a light calcium carbonate manufactured by Shiraishi Kogyo Kaisha, Ltd.

(2-6) Super S, a heavy calcium carbonate manufactured by Maruo Calcium Co., Ltd.

The physical properties of the fillers used in the present invention were measured by the following methods.

(1) Measurement of Average Particle Diameter and Particle Size Distribution

The average particle diameters and particle size distributions of the fillers were determined using the following apparatus.

Laser diffraction scattering apparatus: Microtrac Particle Size Analyzer X-100 manufactured by Nikkiso Co., Ltd.

Dispersant: Aron T50 manufactured by Toagosei Co., Ltd.

From the resultant cumulative particle size distribution chart, particle diameters corresponding to cumulative particle size frequencies of 10, 50 and 90, in the order of increasing particle diameter were called D10, D50 and D90. Then, D50 was used as an average particle diameter and (D90-D10)/D50 as a sharpness of particle size.

(2) Calculation of Average Aspect Ratio

The following apparatuses were used to observe the average aspect ratio (measurement of the average major and minor-axis lengths) and shape of the fillers.

Fine Coater: JFC-1600 manufactured by JOEL Ltd.

Coating conditions: 30 mA and 60 seconds.

Scanning electron microscope: JSM-6700F manufactured by JOEL Ltd.

Measurement conditions: an acceleration voltage of 9.00 kV and an impressed current of 10.0 μA.

The above shape was calculated by defining the shortest distance between two parallel lines touching the outline of the plan view of the particle as the minor-axis length and the maximum distance between the parallel lines in the direction perpendicular thereto as the major-axis length according to Heywood's definition. Here, the average particle diameter, average major-axis length and average aspect ratio were calculated by the following equation when $N_i$ filler particles with $L_i$ in major-axis length and $D_i$ in minor-axis length are present in unit volume.

Average particle diameter=Average major-axis length=$\Sigma L_i^2 N_i / \Sigma L_i N_i$ Average minor-axis length=$\Sigma D_i^2 N_i / \Sigma D_i N_i$ Average aspect ratio $L/D = (\Sigma L_i^2 N_i / \Sigma L_i N_i)/(\Sigma D_i^2 N_i / \Sigma D_i N_i)$ More specifically, the aspect ratio was determined by photographing particle images at a magnification of 1,000 to 50,000 times (a magnification of a degree that the shape of the filler can be observed) using a scanning electron microscope (SEM) and then measuring each length of at least 100 filler particles randomly selected.

(3) Quantitative Determination of Ca, Na and Sr in the Calcium Carbonate and Calculation of Amount of Na and Sr Based on Ca The calcium carbonate (0.5 g) is weighed in a platinum dish and carbonized in an electric furnace at 500° C. The carbonized material is cooled and then subjected to addition of 5 mL of hydrochloric acid and 5 mL of purified water, which is dissolved by boiling on a heater. The solution is again cooled and subjected to addition of purified water into a measurable concentration. The quantitative determination thereof was carried out at the characteristic wavelength of each metal by inductively coupled plasma (ICP) optical emission spectrometry using IRIS/IP manufactured by Thermo Jarrell Ash Corporation. Thereafter, the amounts of Na and Sr based on Ca were calculated.

These characteristics are shown in Table 1.

<Dispersants>

(3-1) F-3, stearic acid manufactured by Kawaken Fine Chemicals Co., Ltd.

(3-2) KBM-603, an aminosilane manufactured by Shin-Etsu Silicone Co., Ltd.

<Polyacetal Resin Compositions>

Polyacetal resin compositions (Production Examples 1 to 9) used in gears were prepared according to the following Production Examples using the above components.

A polyacetal, a filler and a dispersant were weighed in the composition described in Table 2 and stirred and mixed using a hand blender. Using a twin-screw extruder (PCM-30 manufactured by Ikegai, Ltd.), the mixture was added at the top of the extruder for melt-kneading to provide a polyacetal resin composition. At the time, the melt-kneading was performed under conditions of a temperature of 200° C. and a rotation speed of 100 rpm. The mechanical characteristics of the polyacetal resin composition are shown in Table 2.

Examples 1 to 5 and Comparative Examples 1 to 7

Gears were molded from polyacetal resin compositions or polyacetals and measured for durability, dimensional accuracy and rotation transmission accuracy. The polyacetal resin composition and polyacetal used in each Example and each Comparative Example are shown in Table 3.

<Durability Test>

Each polyacetal resin composition or each polyacetal was injection-molded to provide a gear. The devices and conditions used were as follows.

Injection-molding machine: ROBOSHOT α-50iA manufactured by Fanuc Ltd.

Cylinder temperature: 190° C., Injection time: 13 seconds, Cooling time: 10 seconds.

Mold: Spur gear mold (module: 0.8, number of teeth: 50, pitch circle diameter: 40 mm), Mold temperature: 80° C.

Testing machine: Gear durability test machine (manufactured by Toshiba Socio-Tech)

Test method: A method for testing in the presence or absence of grease was used.

Testing in the presence of grease: The flank was coated with grease (Molykote EM-SOL manufactured by Dow Coning Toray Co., Ltd.), followed by measuring the number of rotations required till the test gears are broken down at a torque of 1.2 N·m. In this respect, the upper limit thereof was set to $2.0 \times 10^7$ rotations to make the measurement more efficient.

Testing in the absence of grease: The number of rotations was measured without lubrication, which is required till the test gears are broken down at a torque of 1.8 N·m. In addition, after testing, it was visually discriminated whether the flank is molten or not.

Table 3 shows that the injection-molded gears of the present invention have equivalent or higher durability than the gears using the common polyacetals (Comparative Examples 5 to 7). The gears of the present invention continue to rotate without any addenda worn and molten under no lubrication and high torque, showing that they are more excellent than those using the common polyacetals. This enables the gears of the present invention to be used, even in an environment of high torque loading thereon, with the angle being accurately transmitted without tooth skipping and without the generation of cracking in the gears.

<Dimensional Accuracy>

Each polyacetal resin composition or each polyacetal was injection-molded to provide a gear. The devices and conditions used were as follows.

Injection-molding machine: ROBOSHOT α-50iA manufactured by Fanuc Ltd.

Cylinder temperature: 190° C., Injection time: 13 seconds, Cooling time: 10 seconds.

Mold: Spur gear mold (module: 0.6, number of teeth: 100, pitch circle diameter: 60 mm), Mold temperature: 80° C.

Addendum circle diameter: 61.2 mm

The evaluation method is described below. The evaluation results are shown in Table 3.

Roundness: The roundness of the inner circumference of the sample rim was measured using a roundness/cylindrical form measuring machine (Roundtest RA-400 manufactured by Mitutoyo Corporation).

Cumulative pitch error, tooth space runout and tooth trace error: The accuracy of the gear samples was measured using a 0.5 mm probe employing a gear measuring machine (GC-1HP manufactured by Osaka Seimitsu Kikai Co., Ltd.) according to JIS D 1702: 1998.

<Rotation Transmission Accuracy (Single Flank Meshing Test)>

The gears prepared in <Dimensional Accuracy> were used for evaluation. The test was performed under the following conditions using a Measuring Equipment for Angular Transfer Accuracy of Gear Train (MEATA-4a manufactured by Ogasawara Precision Laboratory Ltd.); the accuracy during 3 rotations was measured according to JIS B1702-1.

Master gear: module: 0.6, pitch circle diameter: 60 mm, number of teeth: 100, metal gear having a pre-grade of accuracy, center distance: 60.060 mm Torque: 0.39 N·m Rotation speed: 300 rpm as the rotation speed of the molded gear Temperature: 23° C.

Humidity: 50 RH %

Here, as used herein, the total meshing error refers to a measurement obtained from a single-flank meshing test according to JIS B1702.

An inspection gear (master gear) was mounted on the driving side, which has the same initial specifications (module, number of teeth, standard normal pressure angle, and helical angle) as those of the molded gear. The gear used had a face width larger than the effective face width of a sample gear for measurement. The sample gear for measurement was mounted on the working side.

Center distance: A pitch circle+0.1× a module for each of the master gear and sample gear for measurement.

Number of preliminary rotations before testing: 10 rotations.

Measurement: After preliminary rotation, the sample gear for measurement was rotated 3 turns to measure the advance and delay of the rotation angle of the sample gear for measurement for each turn to calculate the total meshing error according to JIS B1702.

The maximum total meshing error during 3 rotations is shown in Table 3.

The total meshing error indicates the rotation transmission error (angle) of the gear during from the initial state to 3 rotations. As shown in Table 3, the injection-molded gear of the present invention is excellent in the balance between dimensional accuracy and the rotation transmission accuracy indicated by the total meshing error. This enables a gear train to be incorporated without rattling and probably makes it possible to accurately transmit the movement of the gear when the gear is driven.

<Rotation Transmission Accuracy (Amount of Total Meshing Error Change)>

Each polyacetal resin composition or each polyacetal was injection-molded to provide a gear. The devices and conditions used were as follows.

Injection-molding machine: ROBOSHOT α-50iA manufactured by Fanuc Ltd.

Cylinder temperature: 190° C., Injection time: 13 seconds, Cooling time: 15 seconds.

Mold: Helical gear mold (module: 0.6, number of teeth: 100, helical angle: 20°), Mold temperature: 80° C.

The rotation transmission accuracy (the amount of total meshing error change) of these injection-molded gears was measured by the following method.

The test was performed under the following conditions using a Measuring Equipment for Angular Transfer Accuracy of Gear Train (MEATA-4a manufactured by Ogasawara Precision Laboratory Ltd.); the accuracy during 3 rotations was measured according to JIS B1702-1. At the time, the amount of total meshing error change based on the amount of torque change (defined as Y) was calculated by the following equation to determine the accuracy. The evaluation results are shown in Table 3.

Master gear: module: 0.6, number of teeth: 100, helical angle: 200, metal gear having a pre-grade of accuracy, center distance: 62.176 mm Rotation speed: 300 rpm Total meshing error (s) when the torque is 0.20 N·m: $T_1$ Total meshing error (s) when the torque is 0.60 N·m: $T_2$ Amount of total meshing error change based on the amount of torque change $$=(T_2-T_1)/(0.60-0.20)$$

$$=(T_2-T_1)/0.40(s/N \cdot m)$$

Here, the accuracy was determined as "excellent" (a gear rotates with approximately constant accuracy against torque change.) when Y=less than 5, as "good" (a gear rotates with a certain range of accuracy against torque change.) when Y=5 or less than 20, and as "poor" (a gear is affected by torque change, which results in the variation of rotation transmission accuracy) when Y=20 or more.

Table 3 shows that the injection-molded gears of the present invention tend to rotate with constant accuracy even when the torque on the gears is changed and will be excellent in rotation transmission accuracy, for example, even when the gears are subjected to an abnormal torque or used in an environment in which the torque greatly changes.

TABLE 1

| Filler | 2-1 | 2-2 | 2-3 | 2-4 | 2-5 | 2-6 |
|---|---|---|---|---|---|---|
| Type | light calcium carbonate | Light calcium carbonate | Light calcium carbonate | Light calcium carbonate | Light calcium carbonate | Heavy calcium carbonate |
| Average particle diameter D50 (μm) | 0.09 | 0.22 | 0.51 | 1.45 | 3.12 | 5.16 |
| D90 (μm) | 0.451 | 0.884 | 0.938 | 2.13 | 5.39 | 12.7 |
| Particle size distribution (D90 – D10)/D50 | 1.10 | 1.11 | 1.13 | 1.80 | 2.60 | 1.92 |
| Average aspect ratio (L/D) | 1.0 | 1.0 | 1.0 | 2.5 | 3.8 | 1.0 |
| Shape | Cubical | Cubical | Cubical | Spindle | Acicular/amorphous mixture | Amorphous |
| Amount of Na based on Ca (ppm) | 700 | 750 | 50 | 30 | 20 | 20 |
| Amount of Sr based on Ca (ppm) | 260 | 700 | 820 | 790 | 1030 | 400 |
| BET adsorption (m²/g) | 16 | 18 | 12 | 5 | 6 | 5 |

TABLE 2

| Polyacetal resin composition | Production Ex. 1 | Production Ex. 2 | Production Ex. 3 | Production Ex. 4 | Production Ex. 5 | Production Ex. 6 | Production Ex. 7 |
|---|---|---|---|---|---|---|---|
| Polyacetal | | | | | | | |
| Type | 1-2 | 1-2 | 1-2 | 1-2 | 1-2 | 1-2 | 1-2 |
| Blending amount | 100 | 100 | 100 | 100 | 100 | 100 | 100 |
| Filler | | | | | | | |
| Type | 2-1 | 2-2 | 2-3 | 2-3 | 2-3 | 2-3 | 2-4 |
| Blending amount | 30 | 30 | 20 | 30 | 30 | 40 | 30 |
| Dispersant | | | | | | | |
| Type | — | 3-1 | 3-1 | 3-1 | 3-2 | 3-1 | 3-1 |
| Blending amount | — | 0.9 | 0.6 | 0.9 | 0.9 | 1.2 | 0.9 |
| Physical properties of resin composition | | | | | | | |
| Bending modulus (GPa) | 3.90 | 3.95 | 3.45 | 3.86 | 3.92 | 4.15 | 3.89 |
| Bending strength (MPa) | 90 | 91 | 89 | 88 | 93 | 83 | 87 |
| Tensile elongation (%) | 13 | 15 | 40 | 36 | 29 | 34 | 24 |

TABLE 2-continued

| | | | | | | | |
|---|---|---|---|---|---|---|---|
| Tensile strength (MPa) | 45 | 45 | 49 | 45 | 48 | 41 | 45 |
| Notched Izod (J/m) | 36 | 36 | 71 | 70 | 66 | 65 | 39 |

| | Polyacetal resin composition | Production Ex. 8 | Production Ex. 9 | Polyacetal | | |
|---|---|---|---|---|---|---|
| | Polyacetal | | | | | |
| | Type | 1-2 | 1-2 | 1-1 | 1-2 | 1-3 |
| | Blending amount | 100 | 100 | 100 | 100 | 100 |
| | Filler | | | | | |
| | Type | 2-5 | 2-6 | — | — | — |
| | Blending amount | 30 | 30 | — | — | — |
| | Dispersant | | | | | |
| | Type | 3-1 | 3-1 | — | — | — |
| | Blending amount | 0.9 | 0.9 | — | — | — |
| | Physical properties of resin composition | | | | | |
| | Bending modulus (GPa) | 3.91 | 3.50 | 3.05 | 2.94 | 2.80 |
| | Bending strength (MPa) | 89 | 85 | 98 | 97 | 95 |
| | Tensile elongation (%) | 29 | 18 | 40 | 43 | 45 |
| | Tensile strength (MPa) | 45 | 43 | 64 | 63 | 62 |
| | Notched Izod (J/m) | 39 | 36 | 60 | 60 | 61 |

TABLE 3

| Type of polyacetal resin composition | Ex. 1 Production Ex. 2 | Ex. 2 Production Ex. 3 | Ex. 3 Production Ex. 4 | Ex. 4 Production Ex. 6 | Ex. 5 Production Ex. 7 | Comp. Ex. 1 Production Ex. 1 | Comp. Ex. 2 Production Ex. 5 | Comp. Ex. 3 Production Ex. 8 | Comp. Ex. 4 Production Ex. 9 | Comp. Ex. 5 Polyacetal 1-1 | Comp. Ex. 6 Polyacetal 1-2 | Comp. Ex. 7 Polyacetal 1-3 |
|---|---|---|---|---|---|---|---|---|---|---|---|---|
| Filler | | | | | | | | | | | | |
| Type | 2-2 | 2-3 | 2-3 | 2-3 | 2-4 | 2-1 | 2-3 | 2-5 | 2-6 | — | — | — |
| Blending amount (Based on 100 parts by mass of polyacetal) | 30 | 20 | 30 | 40 | 30 | 30 | 30 | 30 | 30 | — | — | — |
| Average particle diameter D50 (μm) | 0.22 | 0.51 | 0.51 | 0.51 | 1.45 | 0.09 | 0.51 | 3.12 | 5.16 | — | — | — |
| Particle size distribution (D90 − D10)/D50 | 1.11 | 1.13 | 1.13 | 1.13 | 1.80 | 1.10 | 1.13 | 2.60 | 1.92 | — | — | — |
| Average aspect ratio (L/D) | 1.0 | 1.0 | 1.0 | 1.0 | 2.5 | 1.0 | 1.0 | 3.8 | 1.0 | — | — | — |
| Proportion of particles having aggregate diameter of 3 μm or more (%) | 9 | 3 | 3 | 5 | 9 | 12 | 35 | 15 | 84 | — | — | — |
| Durability test | | | | | | | | | | | | |
| Durability test, presence of grease, rotation (×10⁷ rotationss) | 2.0 or more | 2.0 or more | 2.0 or more | 2.0 or more | 2.0 or more | 0.2 | 0.02 | 0.3 | 0.6 | 2.0 or more | 2.0 or more | 2.0 or more |
| Durability test, absence of grease, rotation (×10⁶ rotations) | — | 2.8 | 2.9 | 2.5 | — | — | — | — | — | 1.2 | 1.8 | 1.2 |
| Presence of molten flank | — | No | No | No | — | — | — | — | — | Yes | Yes | Yes |
| Dimensional accuracy | | | | | | | | | | | | |
| Roundness (μm) | 13 | 13 | 11 | 9 | 6 | 8 | — | 23 | 12 | 14 | 29 | 36 |
| Cumulative pitch error (μm) | 29 | 34 | 29 | 18 | 22 | 21 | — | 23 | 31 | 36 | 37 | 40 |
| Tooth space runout (μm) | 25 | 48 | 24 | 23 | 22 | 36 | — | 29 | 37 | 41 | 52 | 51 |
| Tooth trace error (μm) | 8 | 15 | 13 | 15 | 11 | 10 | — | 16 | 14 | 11 | 11 | 16 |

TABLE 3-continued

| Type of polyacetal resin composition | Ex. 1 Production Ex. 2 | Ex. 2 Production Ex. 3 | Ex. 3 Production Ex. 4 | Ex. 4 Production Ex. 6 | Ex. 5 Production Ex. 7 | Comp. Ex. 1 Production Ex. 1 | Comp. Ex. 2 Production Ex. 5 | Comp. Ex. 3 Production Ex. 8 | Comp. Ex. 4 Production Ex. 9 | Comp. Ex. 5 Polyacetal 1-1 | Comp. Ex. 6 Polyacetal 1-2 | Comp. Ex. 7 Polyacetal 1-3 |
|---|---|---|---|---|---|---|---|---|---|---|---|---|
| Rotation transmission accuracy | | | | | | | | | | | | |
| Single flank meshing test, torque: 0.39 (N·m), total meshing error | 2'26" | 3'28" | 2'55" | 2'24" | 3'53" | 2'11" | | 3'40" | 4'23" | 3'36" | 4'19" | 4'39" |
| Amount of total meshing error change based on amount of torque change | Good | Good | Excellent | Excellent | Good | Poor | | Poor | Excellent | Poor | Poor | Poor |

INDUSTRIAL APPLICABILITY

The gear obtained in the present invention can be suitably used in various fields including automobile, electric and electronic and other industrial fields because it has durability and is excellent in dimensional accuracy and rotation transmission accuracy.

The invention claimed is:

1. An injection-molded gear made of a polyacetal resin composition comprising more than 5 and less than 100 parts by mass of a filler (II) and 0 or less than 10 parts by mass of an organic acid (III) based on 100 parts by mass of the polyacetal (I), characterized in that the filler (II) has a particle size distribution satisfying the following general expression and an average aspect ratio (L/D), i.e., a ratio of an average major-axis length (L) of the particles to an average minor-axis length (D) of the particles, of less than 3; and the gear comprises 10% or less of aggregates of the filler (II) having an aggregate diameter of 3 μm or more:

$$0.1 \text{ μm} < D50 < 1.5 \text{ μm}$$

$$0 < (D90 - D10)/D50 \leq 2$$

(wherein D10, D50 and D90 represent particle diameters corresponding to cumulative particle size frequencies of 10, 50 and 90, in the order of increasing particle diameter, as measured by a laser diffraction scattering method).

2. An injection-molded gear made of a polyacetal resin composition comprising more than 5 and less than 100 parts by mass of a filler (II) and 0 or less than 10 parts by mass of an organic acid (III) based on 100 parts by mass of the polyacetal (I), characterized in that the filler (II) has a particle size distribution satisfying the following general expression and an average aspect ratio (L/D), i.e., a ratio of an average major-axis length (L) of the particles to an average minor-axis length (D) of the particles, of less than 3; and the gear has a total meshing error (according to JIS B1702) of less than 5 minutes in a single-flank meshing test:

$$0.1 \text{ μm} < D50 < 1.5 \text{ μm}$$

$$0 < (D90 - D10)/D50 \leq 2$$

(wherein D10, D50 and D90 represent particle diameters corresponding to cumulative particle size frequencies of 10, 50 and 90, in the order of increasing particle diameter, in particle size measurement by a laser diffraction scattering method).

3. An injection-molded gear made of a polyacetal resin composition comprising more than 5 and less than 100 parts by mass of a filler (II) and 0 or less than 10 parts by mass of an organic acid (III) based on 100 parts by mass of the polyacetal (I), characterized in that the filler (II) has a particle size distribution satisfying the following general expression and an average aspect ratio (L/D), i.e., a ratio of an average major-axis length (L) of the particles to an average minor-axis length (D) of the particles, of less than 3; and the gear comprises 10% or less of aggregates of the filler (II) having an aggregate diameter of 3 μm or more and has a total meshing error of less than 5 minutes in a single-flank meshing test:

$$0.1 \text{ μm} < D50 < 1.5 \text{ μm}$$

$$0 < (D90 - D10)/D50 \leq 2$$

(wherein D10, D50 and D90 represent particle diameters corresponding to cumulative particle size frequencies of 10, 50 and 90, in the order of increasing particle diameter, as measured by a laser diffraction scattering method).

4. The injection-molded gear according to claim 1, characterized in that the resin composition comprises more than 20 and less than 80 parts by mass of the filler (II) based on 100 parts by mass of the polyacetal (I).

5. The injection-molded gear according to claim 1, characterized in that the filler (II) is an inorganic filler.

6. The injection-molded gear according to claim 1, characterized in that the filler (II) has a particle size distribution satisfying the following general expression:

$$0.1 \text{ μm} < D50 < 1.5 \text{ μm}$$

$$0 < (D90 - D10)/D50 \leq 2.$$

7. The injection-molded gear according to claim 1, characterized in that the filler (II) is spherical, cubical, rectangular parallelepiped or amorphous, or a mixture thereof.

8. The injection-molded gear according to claim 1, characterized in that the filler (II) has a BET specific surface area of 10 to 200 m²/g.

9. The injection-molded gear according to claim 1, characterized in that the filler (II) has a D90 of 1.5 μm or less.

10. The injection-molded gear according to claim 1, characterized in that the filler (II) is calcium carbonate.

11. The injection-molded gear according to claim 10, characterized in that the filler (II) is light calcium carbonate.

12. The injection-molded gear according to claim 1, characterized in that the filler (II) is calcium carbonate, wherein the calcium carbonate has a content of Na of 250 ppm or less based on Ca.

13. The injection-molded gear according to claim 1, characterized in that the filler (II) is calcium carbonate, wherein the calcium carbonate has a content of Sr of 500 ppm to 2,500 ppm based on Ca.

14. The injection-molded gear according to claim 10, characterized in that the resin composition comprises 0.01 or less than 5 parts by mass of the organic acid (III) based on 100 parts by mass of the polyacetal (I).

15. The injection-molded gear according to claim 14, characterized in that the organic acid (III) is a saturated fatty acid having 8 to 36 carbon atoms.

16. The injection-molded gear according to claim 15, characterized in that the organic acid (III) is stearic acid.

17. The injection-molded gear according to claim 1, characterized in that the polyacetal (I) is obtained by stabilizing treatment of the thermally unstable ends thereof using at least one quaternary ammonium compound represented by the following formula:

$$[R^1R^2R^3R^4N^+]_n X^{n-}$$

(wherein $R^1$, $R^2$, $R^3$ and $R^4$ each independently represent an alkyl group having 1 to 30 carbon atoms or an aryl group having 6 to 20 carbon atoms; the alkyl group is straight-chain, branched or cyclic; a hydrogen atom(s) in the alkyl or aryl group is optionally substituted with an alkyl group, an aryl group or halogen; n represents an integer of 1 to 3; and X represents a hydroxyl group or an acid residue of a carboxylic acid having 1 to 20 carbon atoms, a hydroacid, an oxo acid, an inorganic thioacid or an organic thioacid having 1 to 20 carbon atoms.).

18. The injection-molded gear according to claim 1, characterized in that the polyacetal (I) is a copolymer having a melting point of 164 to 172° C.

19. A method for producing the injection-molded gear according to claim 1, characterized in that a polyacetal resin composition is injection-molded which is obtained by simultaneously melt-kneading the polyacetal (I), the filler (II) and the organic acid (III).

* * * * *